(12) United States Patent
Madhusudana et al.

(10) Patent No.: US 9,304,779 B2
(45) Date of Patent: Apr. 5, 2016

(54) OPTIMIZING BOOT TIME OF A STORAGE SYSTEM

(71) Applicant: LSI CORPORATION, San Jose, CA (US)

(72) Inventors: Naresh Madhusudana, Bangalore (IN); Naveen Krishnamurthy, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 13/971,417

(22) Filed: Aug. 20, 2013

(65) Prior Publication Data

US 2014/0359266 A1  Dec. 4, 2014

(30) Foreign Application Priority Data

Jun. 4, 2013  (IN) .............................. 2439CHE2013

(51) Int. Cl.
*G06F 9/44* (2006.01)
*G06F 1/24* (2006.01)

(52) U.S. Cl.
CPC ............... *G06F 9/4401* (2013.01); *G06F 1/24* (2013.01)

(58) Field of Classification Search
CPC ................................. G06F 9/4401; G06F 1/24
See application file for complete search history.

(56) References Cited

U.S. PATENT DOCUMENTS

| 6,434,696 | B1* | 8/2002 | Kang | G06F 1/24 713/2 |
| 7,340,593 | B2* | 3/2008 | Martin | G06F 9/4406 711/141 |
| 8,312,258 | B2 | 11/2012 | Xing et al. | |
| 2002/0133695 | A1* | 9/2002 | Khatri | G06F 9/4411 713/1 |
| 2004/0064686 | A1* | 4/2004 | Miller | G06F 9/4401 713/1 |
| 2005/0015215 | A1* | 1/2005 | Zhang | G06F 9/4418 702/119 |

OTHER PUBLICATIONS

Message Passing Interface (MPI), Blaise Barney, Lawrence Livermore National Laboratory, pp. 1-3, retieved Aug. 23, 2015.*
"Symantec NetBackup PureDisk™ Storage Pool Installation Guide" Windows, Linux, and UNIX Release 6.6.0.2, Publication release 6.6.0.2, revision 1Copyright © 2009 Symantec Corporation. All rights reserved.

* cited by examiner

*Primary Examiner* — Stefan Stoynov

(57) ABSTRACT

Systems and methods herein provide a storage system that optimizes the boot time when the storage system is rebooted. One embodiment includes a storage controller operable to determine a topology of one or more storage devices. The storage controller stores the topology in memory. When the storage controller detects a system reboot event, it provides the stored topology to the host and directs the host to reboot with the stored topology.

18 Claims, 5 Drawing Sheets

OPTIMIZING BOOT TIME OF A STORAGE SYSTEM

CROSS REFERENCE TO RELATED APPLICATIONS

This document claims priority to Indian Patent Application Number 2439/CHE/2013 filed on Jun. 4, 2013 (entitled OPTIMIZING BOOT TIME OF A STORAGE SYSTEM) which is hereby incorporated by reference

FIELD OF THE INVENTION

The invention generally relates to the field of data storage systems.

BACKGROUND

A typical storage system includes a set of storage devices. A defined standard such as Small Computer Systems Interface (SCSI) is used to interconnect the storage devices and a host through one or more storage controllers. When a storage system first boots, the storage controller performs a discovery operation in order to establish communication with the storage devices and determine the topology of storage devices in the system (e.g., number of devices, device properties, etc.) When a reboot of the storage system occurs, the host waits for the storage controller to complete the discovery process and report the topology to the host. Depending on the topology and number of storage devices that makeup the storage system, the discovery process can take several minutes and cause delay in the overall time it takes to boot the storage system.

SUMMARY

Systems and methods herein provide a storage system that optimizes the boot time when the storage system is rebooted. One embodiment includes a storage controller operable to determine a topology of one or more storage devices. The storage controller stores the topology in memory. When the storage controller detects a system reboot event, it provides the stored topology to the host and directs the host to reboot with the stored topology.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
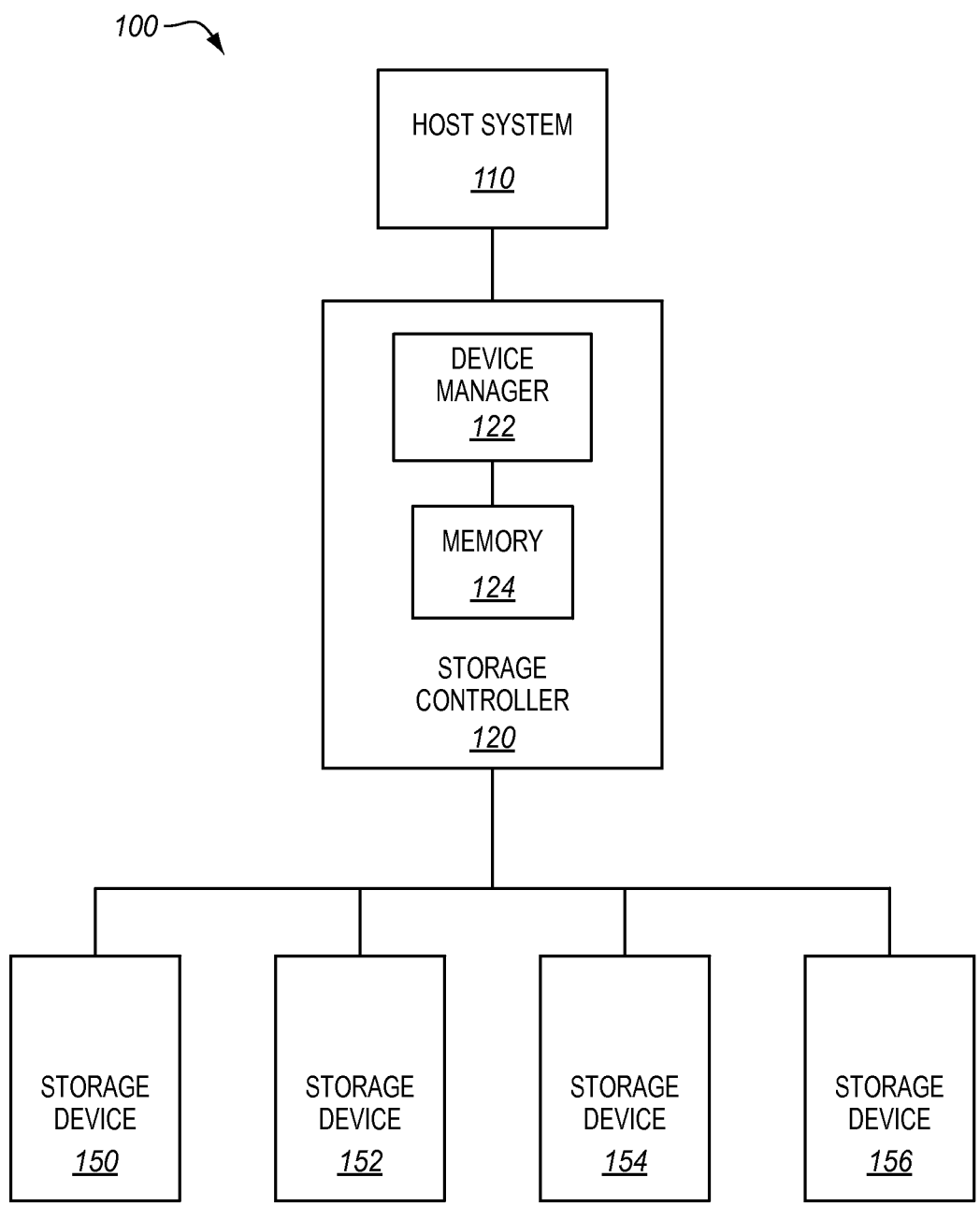
FIG. 1 is a block diagram of a storage system in an exemplary embodiment.

FIG. 1 is a block diagram of an exemplary storage system 100 enhanced to optimize the boot time of the storage system 100. In this embodiment, storage system 100 includes a storage controller 120 that is coupled to a host system 110 and one or more storage devices 150-156. Host system 110 includes an operating system (OS) and/or Basic Input/Output System (BIOS) (not shown) that initiate and complete a boot process for host system 110. When the boot process of host system 110 is complete, it may then issue Input and/or Output (I/O) commands for reading data from or writing data to storage devices 150-156.

During the boot process of host system 110, information about the topology of the storage devices 150-156 is made available to host system 110. Host system 110 uses the topology information to establish communication and initialize storage devices 150-156 so that I/O commands can be sent to storage devices 150-156. Topology information includes, for example, the number of storage devices and the storage device properties. Topology information of storage devices 150-156 is determined by a discovery process that is performed by a device manager 122 of storage controller 120.

In FIG. 1, storage controller 120 has been enhanced so that device manager 122 discovers and stores topology information of storage devices 150-156 in memory 124 and provides the stored topology information to host system 110 in the early stages of a reboot event. Since controller 120 has previously identified the topology during a first boot-up, host system 110 can avoid waiting for storage controller 120 to perform a complete discovery process for a second boot-up (i.e., reboot). In this way, host system 110 can perform initialization and boot the OS without a discovery delay. Meanwhile, or at a later time, storage controller 120 performs discovery and reports changes in topology to host system 110. Thus, the overall boot time of the storage system is shortened and does not depend on topology size and/or discovery time.

Storage controller 120 may be any suitable device operable to perform discovery, manage data provisioned at storage devices 150-156 and/or process I/O commands directed to the data that it manages. Storage controller 120 may be implemented, for example, as custom circuitry, as a special or general purpose processor executing programmed instructions stored in an associated program memory, or some combination thereof. Storage controller 120 may comprise an independent Serial Attached SCSI (SAS) device, a Host Bus Adapter (HBA) of a host, an integrated component of a host, etc.

Storage controller 120 includes a front-end interface (not shown) adapted to couple with host system 110 and a back-end interface (not shown) adapted to couple with storage devices 150-156. Back-end interface and front end interface may communicate with storage devices 150-156 and host system 110 using of a variety of protocols, for example, SAS, Serial Advanced Technology Attachment (SATA), Fibre Channel, SCSI, etc. Storage controller 120 may be part of a host system (not shown in FIG. 1), and communicate with its attached host via various bus protocols, such as Peripheral Component Interconnect Express (PCIe), PCI-Extended (PCI-X), etc. Therefore, one skilled in the art will recognize that the protocols and busses used to implement storage controller 102 are merely design choices.

Storage controller 102 further includes device manager 122 and memory 124. Device manager 122 is capable of discovering coupled storage devices and determining the topology of the coupled storage devices. Device manager 122 is also capable of storing data associated with the discovered topology information in memory 124 and providing the topology information to host system 110. Memory 124 comprises any system, component, or device that is able to store data for access. Some examples of memory 124 include, Random Access Memory (RAM), Non-Volatile (e.g., flash or NVRAM) memory, Magnetic (e.g., MRAM) memory, etc. In one embodiment, memory 124 stores data related to the topology of storage devices 150-156.

Host system 110 may be any suitable computing devices/systems including, for example, servers, workstations, PCs, etc. Host system 110 includes computer-executable code such as OS/BIOS that initializes storage controller 120 and storage devices 150-156. In some implementations, OS/BIOS 112 loads a driver that enables communication with storage devices 150-156. As will be discussed in more detail in FIG. 2, upon boot-up, host system 110 employs an initialization routine in order to load the OS and execute various applications.

Storage devices 150-156 may comprise magnetic hard disks, solid state drives, optical media, etc. compliant with protocols for SAS, Serial Advanced Technology Attachment (SATA), Fibre Channel, etc. Although FIG. 1 illustrates four storage devices, one skilled in the art will understand that storage controller 120 may couple any number of storage devices with one or more hosts. Thus, the particular arrangement, number, and configuration of components described herein is exemplary and non-limiting.

Figure 2:
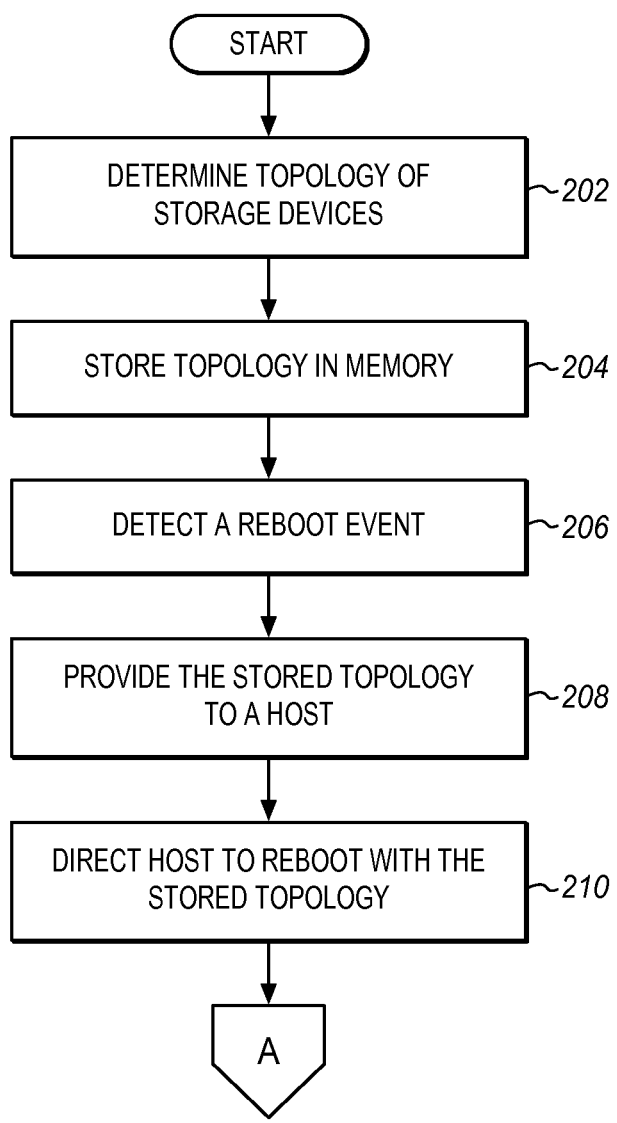
FIG. 2 is a flowchart describing an exemplary method of optimizing boot time of a storage system.

FIG. 2 is a flowchart illustrating a method 200 to optimize the boot time of storage system 100. The steps of method 200 are described with reference to storage system 100 of FIG. 1, but those skilled in the art will appreciate that method 200 may be performed in other systems. The steps of the flowchart(s) described herein are not all inclusive and may include other steps not shown. The steps described herein may also be performed in an alternative order.

A storage controller (e.g., storage controller 120) receives a first initialization command from host system 110. The initialization command indicates that storage system 100 and/or host system 110 have been powered-on and are entering a boot sequence. In one embodiment, in response to receiving an initialization command, storage controller 120 determines whether a previous boot sequence has been completed and/or whether topology information is stored in memory 124.

At step 202, storage controller 120 determines the topology of storage devices 150-156. Topology information describes the present configuration of the system, which may include a description of storage devices in the domain, number of devices, number of volumes, and device properties (such as whether storage devices 150-156 are in spin-up or spin-down mode). The topology information may further describe the paths interconnecting the various devices (including intermediate devices such as expanders). As discussed above, the process of determining the topology information of storage devices 150-156 may be referred to as a discovery operation.

At step 204, storage controller 120 stores the topology information in memory 124. As discussed above, memory 124 may be configured to store the topology information persistently (e.g., not erased when storage system 100 is powered-down) and may be internal or external to storage controller 120. For example, memory 124 may be included as part of host system 110 or storage devices 150-156.

Steps 202 and 204 are performed when storage controller 120 determines that topology information is not stored in memory 124 or that the boot sequence is being entered into for the first time (e.g., newly installed storage controller 120 or host system 110). As will be discussed in more detail below, steps 206-210 are performed when storage controller 120 determines that topology information is stored in memory 124 or that the boot sequence is being entered into for a subsequent time (e.g., reboot or shutdown/power-up cycle).

At step 206, storage controller 120 detects a reboot event. In one embodiment, the reboot event is detected in response to an initialization command sent from host system 110. The initialization command may indicate whether the boot-up is a reboot event or a first boot-up of storage system 100. Alternatively, storage controller 120 may be configured to determine, in response to the initialization command, whether storage system 100 is currently rebooting (e.g., performing a subsequent shutdown cycle) or booting for the first time. For example, storage controller 120 may determine if a previous discovery was performed and/or whether topology information from a previous discovery (e.g., step 202) is stored in memory 124.

At step 208, storage controller 120 provides the stored topology information to host system 110. In one embodiment, storage controller 120 accesses topology information that it previously stored in memory 124. The previously stored topology information is associated with a previous boot sequence (e.g., step 202). The previous boot sequence may comprise the most recent previous boot event where topology information was stored in memory 124. Storage controller 120 may provide the topology information in response to detection of a rebooting sequence (e.g., in response to receiving and processing the initialization command described in step 206).

At step 210, storage controller 120 directs the host system 110 to reboot with the stored topology. Host system 110 thus may receive topology information and begin/continue to initialize and load internal services and an operating system without having to wait for storage controller 120 to perform a discovery. In one embodiment, host system 110 begins initializing internal services and continues to boot (using the previously stored topology information) while the steps described in FIG. 3 are performed.

Figure 3:
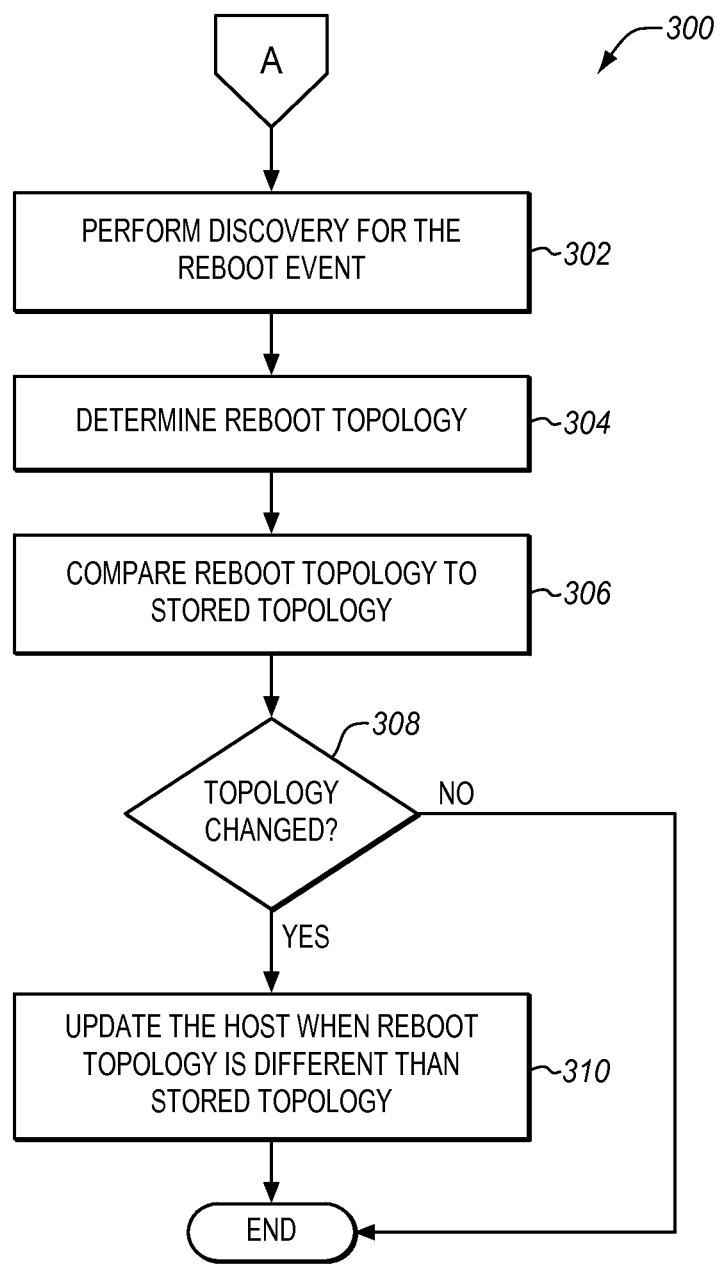
FIG. 3 is a flowchart describing an exemplary method of updating a host with changed topology information.

FIG. 3 is a flowchart illustrating a method 300 of updating a host with changed topology information. The steps of method 300 are described with reference to storage system 100 of FIG. 1, but those skilled in the art will appreciate that method 300 may be performed in other systems. The steps of the flowchart(s) described herein are not all inclusive and may include other steps not shown. The steps described herein may also be performed in an alternative order.

At step 302, storage controller 120 performs discovery for the reboot event. In one embodiment, discovery takes place immediately after storage controller 120 provides the stored topology information to host system 110. In another embodiment, storage controller 120 performs discovery at a later time. For example, discovery for the reboot event may be performed at a later time as indicated by a request command from host system 110 or at a time configured in executable code within storage controller 120.

At step 304, storage controller 120 determines the reboot topology. In one embodiment, storage controller 120 performs discovery and determines the topology information that describes the current configuration of storage system

100. Storage controller 120 may then store the reboot topology information in memory 124 (step not shown).

At step 306, storage controller 120 compares the reboot topology information with the topology information that was previously stored in memory 124 during a prior boot event (e.g., step 204 of FIG. 2). Then, at step 308, storage controller 120 determines whether the topology has changed. When storage controller 120 determines that the topology of the reboot event is different than the topology of the previously stored topology (i.e., the topology of the storage system 100 prior to detection of the reboot at e.g., step 206 of FIG. 2) the method proceeds to step 310. When storage controller 120 determines that the topology of storage system 100 is unchanged (i.e., reboot topology is the same as previously stored topology), the method ends and no further steps are taken. In one embodiment, when storage controller 120 determines that the topology of storage system 100 is unchanged, storage controller 120 generates and sends an indicator to host system 110 that the topology of the storage system has not changed.

At step 310, storage controller 120 updates host system 110 with the reboot topology information. In one embodiment, storage controller updates host system 110 while host system is still in the process of initializing with the previously stored topology information. In another embodiment, storage controller 120 updates host system 110 in response to a determination or received signal that host system 110 has completed initialization. In either event, host system 110 is able to begin initializing after a reboot without waiting for storage controller 120 to perform discovery for the reboot event. This advantage can be realized even in the event that the topology of storage system 100 does change in between boot events, because the update allows host system 110 to initialize/communicate with new devices in the reboot topology simultaneously with or shortly after the initialization that is performed with the previously stored topology (e.g., step 210 of FIG. 2).

EXAMPLE

Figure 4:
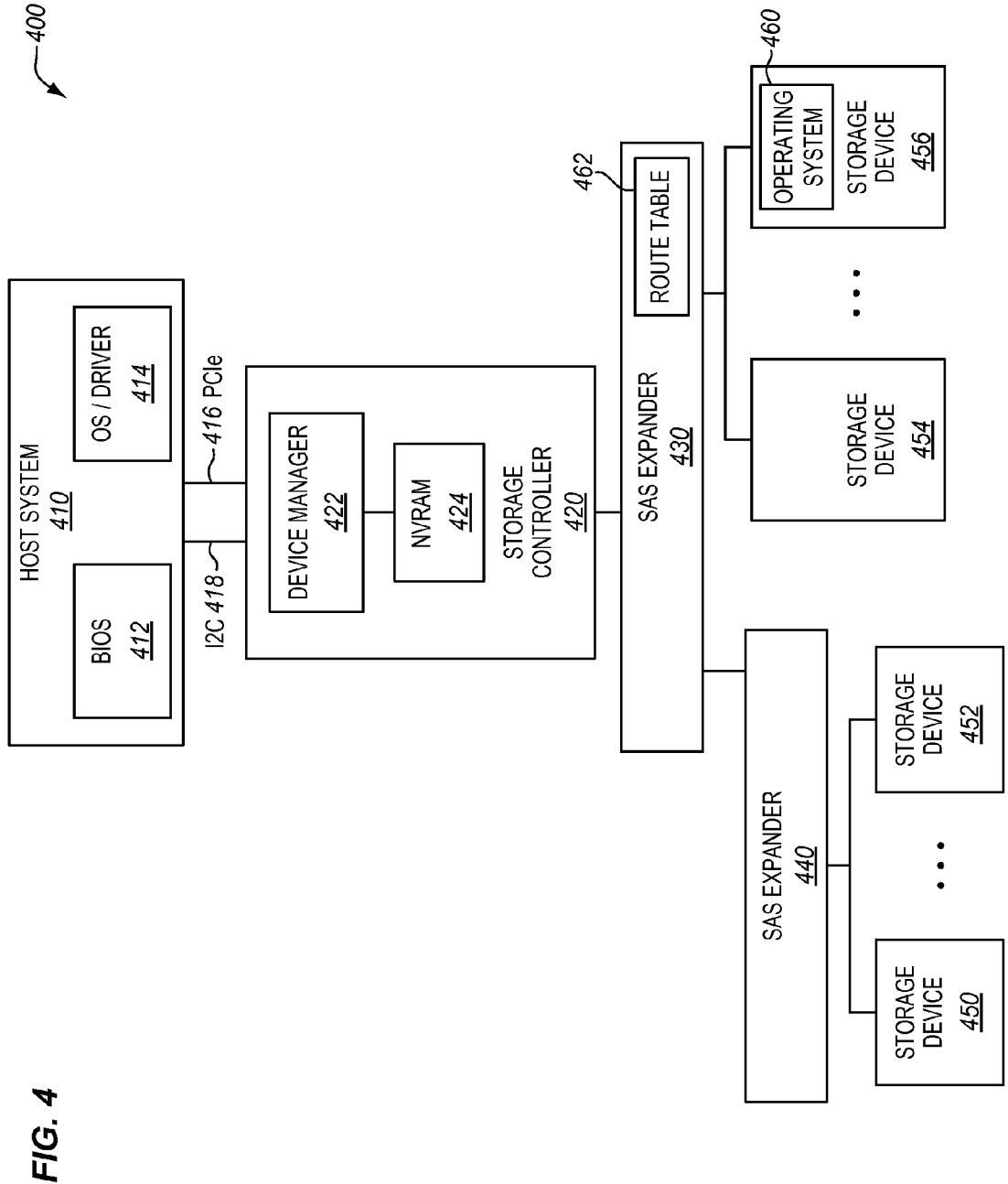
FIG. 4 is another exemplary block diagram of a storage system.

FIG. 4 is a block diagram of an exemplary Serial Attached SCSI (SAS) domain 400 in accordance with features and aspects hereof. In this embodiment, SAS domain 400 includes storage controller 420, which is coupled with SAS expanders 430 and 440, storage devices 450-456, and host system 410. As is shown in FIG. 4, SAS expanders 430 and 440 may be coupled with multiple storage devices. An expander is a device that facilitates communication and provides for routing among multiple SAS devices, where multiple SAS devices (i.e., storage devices 450-456) and additional expanders connect to the ports on the expander.

A BIOS 412 on the host system 410 is configured to be executed first in response to a reset (i.e., reboot event or shut-down/power-up cycle) or an initial boot event (i.e., no previous topology information stored in NVRAM 424) in order to carry out boot-up of SAS domain 400 and internal initialization of host system 410. An initial boot command is sent from BIOS 412 to storage controller 420 to initialize and execute a BIOS (not shown) and/or device manager 422 in storage controller 420. The initial boot command takes place prior to initialization of OS/Driver 414 of host system 410.

Storage controller 420 includes a device manager 422 and NVRAM 424. Device manager 422 is operable to determine whether the initial boot command is associated with a first boot event (e.g., topology information in NVRAM 424 has been erased or does not exist), or a subsequent boot event (e.g., NVRAM 424 contains valid topology information in NVRAM 424). Previously stored topology information may be considered valid if, for example, device manager 422 determines that the previous topology was stored in NVRAM 424 within a predetermined timeframe as compared to the time of the most recently received initial boot command. Alternatively, a user/host system 410 may provide indication to storage controller 420 that previously stored topology is or is not valid.

In one embodiment, storage controller 420 comprises a PCI-e interface for communication with host system 410 over PCI-e bus 416. BIOS 412 or OS/Driver 414 sends the initial boot command over PCI-e bus 416 to initialize storage controller 420. Once storage controller 420 is initialized and has topology information stored in NVRAM 424, BIOS 412 or OS/Driver 414 sends a Message Passing Interface (MPI) command to storage controller 420. In response, storage controller 420 returns the most recent topology information stored in NVRAM 424 via PCI-e bus 416. In this way, inband communication and a new message command are used so that the existing board design of storage controller need not change (i.e., no additional interfaces are required). In one embodiment, storage controller 420 responds to queries and provides topology information over PCI-e bus 416 after a path to a boot device (or other critical device) is established, as is explained in more detail below.

In another embodiment, storage controller 420 comprises a PCI-e interface and inter-integrated (I2C) interface for communication with host system 410 over PCI-e bus 416 and I2C bus 418, respectively. BIOS 412 or OS/Driver 414 sends the initial boot command over PCI-e bus 416. If valid topology information is stored in NVRAM 424, BIOS 412 or OS/Driver 414 may read the stored topology information from NVRAM 242 via an I2C slave interface of storage controller 420. In one embodiment, storage controller 420 provides topology information stored in NVRAM 424 over I2C bus 418 in response to the initial boot command sent over PCI-e bus 416. In this way, existing architecture for communication across PCI-e does not need to change. In one embodiment, I2C slave in storage controller 420 responds to queries after a path to a boot device (or other critical device) is established, as is explained in more detail below. It will be appreciated by one skilled in the art that the PCI-e bus 416 and I2C bus 418 are merely exemplary and any number of communication architectures may be used to accomplish the features described herein.

When device manager 422 determines that SAS domain 400 is undergoing a first boot event, host system 410 waits for storage controller 420 to: perform discovery, store the topology information associated with the first boot-up in NVRAM 424, and provide the topology information associated with the first boot-up so that host system 410 can initialize. As discussed above, host system 410 requires topology information so that it can continue to boot/initialize. The boot/initialization of host system 410 may include creating RAID volumes, identifying boot devices, initializing boot devices and storage devices, and initializing additional services such as Ethernet, USB, etc.

In one example, device manager 422 determines that no previous topology is stored in NVRAM 424 and then performs discovery, stores the discovered topology in NVRAM 424, and causes the OS/Driver 414 to boot with the current topology. Then, device manager 422 is configured to detect the next reboot event and provide the previous topology information to host system 410 before performing discovery for the current boot event.

However, when device manager 422 determines that SAS domain 400 is undergoing a subsequent boot event (i.e., reboot), storage controller 420 provides the (previously) stored topology information to host system 110 in response to an initial reboot command from BIOS 412. In one embodiment, when device manager determines 422 that SAS domain 400 is undergoing a reboot event and that previous topology information is stored in NVRAM 424, device manager 422 provides previously stored topology information to host system 410 to cause OS/Driver 414 to initialize.

Then, host system 410 is updated at a subsequent point in time if device manager 422 determines that the current topology is different than the previous topology used to begin OS/Driver 414 initialization. Thus, the overall reboot process advantageously does not depend on the time for device manager 422 to perform the discovery associated with the reboot event (i.e., not dependent on size of topology). In one embodiment, device manager 422 is operable to determine the status of storage devices 450-456 (and/or identify and determine the status of a boot device), and to cause the storage/boot device to enter a spin-up mode when the status indicates that the boot device is in spin-down mode. In this way, the overall reboot process is also not dependent on the status of the devices present in the topology (i.e., the time it takes to spin-up each storage devices 450-456).

In one embodiment, when device manager 422 receives an initial boot command, it determines whether an operating system (OS 460) of host system 410 is stored in storage devices 450-456 rather than being included as part of host system 410. When an OS 460 is stored in storage devices 450-456 the OS 460 may be referred to as being behind storage controller 420 and the storage device(s) that store OS 460 (e.g., storage device 456 in FIG. 4) may be referred to as a boot device.

In this embodiment, during a first boot-up event, BIOS 412 and/or OS/Driver 414 wait for and receive details describing the path to the boot device after device manager 422 determines the path during discovery and stores it as part of the topology information in NVRAM 424. Then, in a subsequent reboot event, device manager 422 first configures the path to the boot device and initializes the boot device using the previously stored path details to enable access to the boot device. This way, storage controller 430 and host system 410 can send I/O requests and access the boot device (or boot volume) before performing a complete discovery process for the reboot event. Put another way, device manager 422 may perform a partial discovery to determine and initialize any boot devices (e.g., spin-up a boot device that is in spin-down mode) and paths so that BIOS 412/OS 460 can start pre-boot apps or other initialization. Full discovery may occur at a later time, subsequent to or simultaneously with initialization of OS 460 with previously stored path details (e.g., topology information).

As discussed above, once device manager 422 completes full discovery it may subsequently indicate to host system 410 whether the boot is complete (i.e., whether topology has changed or remained the same since previous boot). If device manager 422 determines that the topology has changed, an update is sent to host system 410. If the topology has not changed, host system 410 can be completely initialized with its current topology using the topology information that was previously stored.

Figure 5:
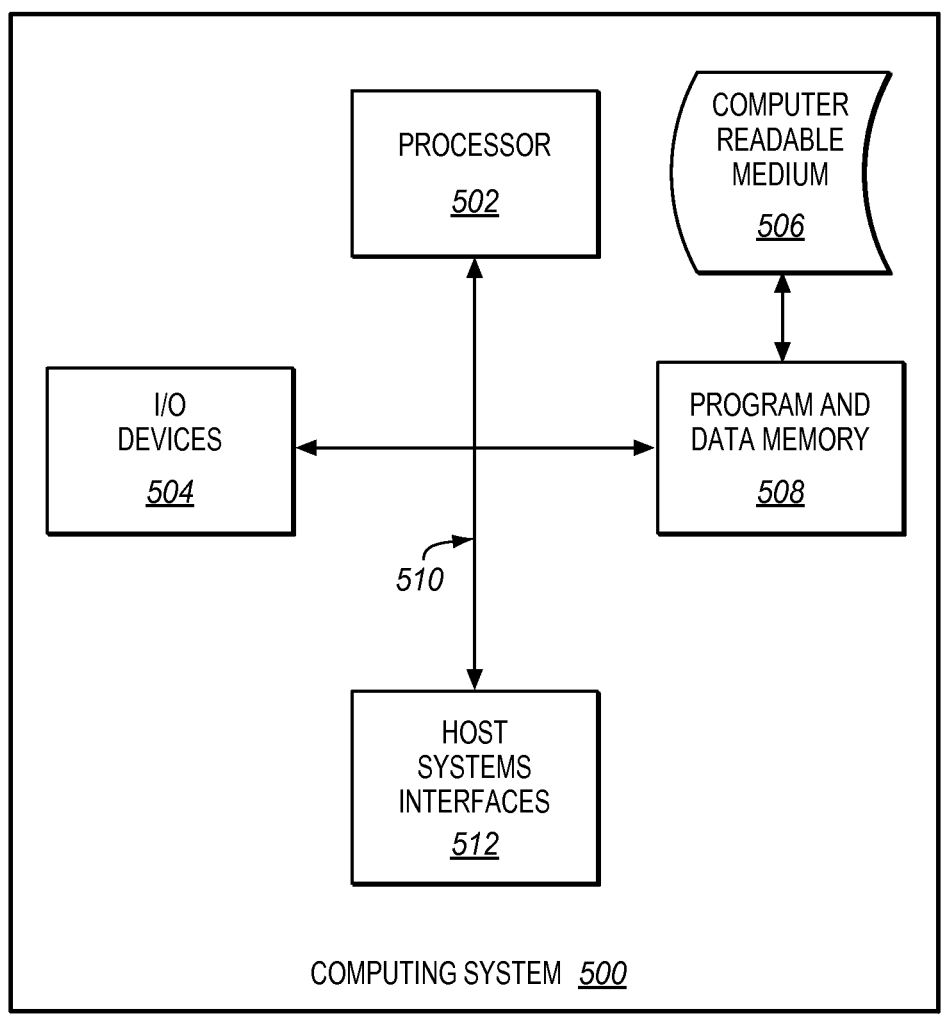
FIG. 5 illustrates an exemplary processing system operable to execute programmed instructions embodied on a computer readable medium.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 500 in which a computer readable medium 506 provides instructions for performing any of the methods disclosed herein.

Furthermore, embodiments of the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computing system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A storage controller, comprising:
   memory; and
   a device manager operable to determine a topology of one or more storage devices of a Serial Attached Small Computer System Interface (SAS) domain under control of the storage controller, to store the topology in the memory, to detect a reboot event of a host, to provide the stored topology to the host, and to direct the host to reboot with the stored topology,
   wherein the storage controller forgoes a SAS discovery process during the reboot when the topology is the same as before the reboot.

2. The storage controller of claim 1, wherein:
   the device manager is further operable to perform a discovery process for the reboot event, to determine a reboot topology of the one or more storage devices, to compare the reboot topology to the stored topology, and to update the host with the reboot topology upon determination that the reboot topology is different than the stored topology.

3. The storage controller of claim 1, wherein:
   the device manager is operable to provide the stored topology via a sideband interface.

4. The storage controller of claim 1, wherein:
the device manager is further operable to provide the stored topology to the host in response to a Message Passing Interface (MPI) command from the host for the stored topology.

5. The storage controller of claim 1, wherein:
the device manager is further operable to detect a boot device included in the one or more storage devices, the boot device storing an operating system of the host; and
upon detection of the reboot event, the device manager is further operable to access the stored topology, to configure a path to the boot device in accordance with the stored topology, and to allow access to the operating system stored in the boot device.

6. The storage controller of claim 5, wherein:
the device manager is further operable to determine the status of the boot device, and to cause the boot device to enter a spin-up mode when the status indicates that the boot device is in spin-down mode.

7. A method operable with a storage controller, comprising:
determining a topology of one or more storage devices of a Serial Attached Small Computer System Interface (SAS) domain under control of the storage controller, wherein the storage devices provide storage for a host;
storing the topology in memory;
detecting a reboot event of the host;
providing the stored topology to the host; and
directing the host to reboot with the stored topology,
wherein the storage controller forgoes a SAS discovery process during the reboot when the topology is the same as before the reboot.

8. The method of claim 7, further comprising:
performing a discovery process for the reboot event;
determining a reboot topology of the one or more storage devices;
comparing the reboot topology to the stored topology; and
updating the host with the reboot topology upon determining that the reboot topology is different than the stored topology.

9. The method of claim 7, wherein the act of providing the stored topology information comprises:
receiving a command from the host through a sideband interface; and
providing the stored topology information to the host through the sideband interface.

10. The method of claim 7, wherein the act of providing the stored topology information comprises:
receiving a Message Passing Interface (MPI) command from the host; and
providing the stored topology information to the host through a Peripheral Component Interconnect Express (PCI-e) interface.

11. The method of claim 7, wherein an operating system of the host is stored in a boot device that is part of the one or more storage devices, the boot device attached to an expander, the method further comprising:
accessing the stored topology in response to detection of the reboot event;
configuring a route table of the expander in accordance with the stored topology; and
enabling access to the operating system stored in the boot device.

12. The method of claim 11, further comprising:
determining the status of the boot device; and
causing the boot device to enter a spin-up mode when the status indicates that the boot device is in spin-down mode.

13. A non-transitory computer readable medium embodying programmed instructions which, when executed by a processor, are operable to:
determine a topology of one or more storage devices of a Serial Attached Small Computer System Interface (SAS) domain under control of a storage controller, wherein the storage devices provide storage for a host;
store the topology in memory;
detect a reboot event of the host;
provide the stored topology to the host; and
direct the host to reboot with the stored topology,
wherein the storage controller forgoes a SAS discovery process during the reboot when the topology is the same as before the reboot.

14. The medium of claim 13, the steps further comprising:
perform a discovery process for the reboot event;
determine a reboot topology of the one or more storage devices;
compare the reboot topology to the stored topology; and
update the host with the reboot topology upon determining that the reboot topology is different than the stored topology.

15. The medium of claim 13, wherein the step of provide the stored topology information comprises:
receive a command from the host through a sideband interface; and
provide the stored topology information to the host through the sideband interface.

16. The medium of claim 13, wherein the step of provide the stored topology information comprises:
receive a Message Passing Interface (MPI) command from the host; and
provide the stored topology information to the host through a Peripheral Component Interconnect Express (PCI-e) interface.

17. The medium of claim 13, wherein an operating system of the host is stored in a boot device that is part of the one or more storage devices, the boot device attached to an expander, the steps further comprising:
access the stored topology in response to detection of the reboot event;
configure a route table of the expander in accordance with the stored topology; and
enable access to the operating system stored in the boot device.

18. The medium of claim 17, the steps further comprising:
determine the status of the boot device; and
cause the boot device to enter a spin-up mode when the status indicates that the boot device is in spin-down mode.

* * * * *